United States Patent [19]
Prince

[11] 4,427,025
[45] * Jan. 24, 1984

[54] SWING CHECK VALVE

[75] Inventor: Darryll G. Prince, Norman, Okla.

[73] Assignee: Prince Valve, Inc., Norman, Okla.

[*] Notice: The portion of the term of this patent subsequent to Dec. 8, 1998 has been disclaimed.

[21] Appl. No.: 299,998

[22] Filed: Sep. 8, 1981

Related U.S. Application Data

[63] Continuation of Ser. No. 44,225, May 31, 1979, Pat. No. 4,304,255.

[51] Int. Cl.³ .............................................. F16K 15/03
[52] U.S. Cl. .................................. 137/527.4; 137/527
[58] Field of Search .................. 137/527, 527.2, 527.4, 137/527.6, 527.8; 251/84, 86, 298, 299, 303, 359, 364

[56] References Cited

U.S. PATENT DOCUMENTS

| | | | |
|---|---|---|---|
| 2,068,833 | 1/1937 | White et al. | 137/527.4 X |
| 2,274,776 | 3/1942 | Cull | 251/84 X |
| 2,312,290 | 2/1943 | Smith et al. | 137/527.4 |
| 2,717,001 | 9/1955 | Perrault | 137/527.4 X |
| 2,739,613 | 3/1956 | Kulikoff | 251/359 X |
| 3,016,914 | 1/1962 | Keithahn | 137/515 |
| 3,131,719 | 5/1964 | Englert et al. | 137/527 |
| 3,172,424 | 3/1965 | Stillwagon | 137/527.4 |
| 3,292,653 | 12/1966 | Scaramucci | 137/527.8 X |
| 3,331,391 | 7/1967 | Merdinyan | 137/527 |
| 3,334,652 | 9/1967 | Wheatley, Jr. | 137/527.4 |
| 3,378,021 | 4/1968 | Milo | 137/527.4 X |
| 3,395,727 | 8/1968 | Weise et al. | 137/527.4 |
| 3,398,926 | 4/1968 | Scaramucci | 251/172 |
| 3,612,097 | 10/1971 | Prince | 137/527.4 |
| 3,963,211 | 6/1976 | Myers | 251/86 X |
| 3,972,504 | 8/1976 | DiSabatino, Jr. | 137/527.4 X |
| 4,079,751 | 3/1978 | Partridge | 137/527 X |
| 4,304,255 | 12/1981 | Prince | 137/527.4 |

FOREIGN PATENT DOCUMENTS 1362172  4/1964  France ............................. 137/527

*Primary Examiner*—Robert G. Nilson
*Attorney, Agent, or Firm*—Hubbard, Thurman, Turner & Tucker

[57] ABSTRACT

A swing check valve having a generally cylindrical body with a fluid passageway extending therethrough, an annular resilient seat molded in place within said passageway and oriented normal to the passageway axis, and a clapper assembly pivotally mounted for rotation about an axis normal to the passageway axis. The clapper assembly includes a spring biased pivoting arm and a generally circular valve loosely mounted to the arm and adapted to engage the seal. The arm and valve are connected by a threaded fastener fixedly mounted to the valve and extending through an oversized aperture near the free end of the arm, and an adjustment nut. During assembly the free movement of the valve with respect to the arm is adjusted by rotating the valve and fastener with respect to the nut until the desired amount of movement is obtained and then welding this nut to the fastener. Any tendency of the valve to spin during operation is eliminated by the walls of a recess formed in the arm which prevent the adjustment nut, fastener and valve assembly from turning.

6 Claims, 3 Drawing Figures

SWING CHECK VALVE

This application is a continuation of application Ser. No. 044,255, filed: May 31, 1979, now U.S. Pat. No. 4,304,255.

BACKGROUND OF THE INVENTION

This invention relates generally to a check valve for use in a fluid conduit and more particularly to an improved swing check valve for use in sanitary sewer systems and the like.

A wide variety of check valves are available to permit fluid to flow in one direction in a conduit but to prevent it from flowing in the other. When used in sanitary sewer systems or similar applications such valves must exhibit a high degree of reliability and a resistance to clogging and corrosion. They should be relatively compact and ideally should be usable in vertical as well as horizontal conduits. Also, they should be relatively inexpensive to manufacture and easy to repair.

Among the check valves presently in use for such applications are of the butterfly and split valve types. While these valves perform adequately under some circumstances, they have a tendency to malfunction when the fluids passing through them contain sand or fibrous materials. They also cause a relatively high pressure loss due to the presence of the valve support structure in the fluid passageway. Swing type check valves have also been used with some success, but many of those presently available are relatively large and cause a substantial pressure drop in the fluid. Also, many are usable only in a horizontal conduit.

In an effort to eliminate the deficiencies of the check valves found in the prior art the inventor herein developed the valve described in U.S. Pat. No. 3,612,097, which was issued on Oct. 12, 1971. The valve disclosed in that patent represents a definite advance in the state of the art and has achieved significant commercial success. Experience with the device, however, has indicated that certain modifications and improvements are desirable. Under some flow conditions the valve tended to spin when open, resulting in undesirable amount of wear on the rivet used to join the valve and arm. Also, the pressed in valve seat protruded radially inward of the inner wall of the flow passageway to facilitate removal, but tended to cause debris to collect upstream of the seat and interfere with seating. In an effort to resolve these problems and to further improve the patented valve the present invention was made.

SUMMARY OF THE INVENTION

This invention can be broadly summarized as providing for an improved swing check valve having a generally cylindrical body defining a fluid passageway extending through the body, an annular resilient seat disposed within the passageway, an arm pivotally mounted to the body for rotation within the passageway about an axis substantially normal to the longitudinal axis of the body, a generally circular valve loosely connected to the arm and adapted to sealably engage the seat, and biasing means connected to the arm for urging the valve into a closed position. A threaded fastener which is fixedly attached to the valve connects the valve and the arm, and permits the valve two degrees of limited rotational freedom with respect to the arm while cooperating with the arm to restrict the rotation of the valve about the axis of the fastener.

In accordance with a more detailed aspect of the invention, the valve is secured to the arm with an adjustment nut locked to the threaded portion of the fastener and at least partially disposed within a recess on the arm. The walls of the recess prevent the nut from rotating significantly and thereby prevent the fastener and valve assembly from spinning about the axis of the fastener.

In accordance with another aspect of the invention, an annular resilient seat is molded in place within the fluid passageway and has a generally cylindrical inner surface which is flush at its upstream edge with the inner surface of the body.

In accordance with yet another aspect of the invention a method for assembling the check valve is provided which includes the steps of fixedly securing one end of the threaded portion of the fastener to the central portion of the valve, connecting the valve to the arm by inserting the threaded portion through an oversized aperture in the arm and securing it with an adjustment nut. Finally, the angular freedom of the valve with respect to the arm is adjusted to a predetermined maximum by tightening the fastener until this desired angular rotation of the valve is obtained and then locking the adjustment nut in position on the threaded portion.

DESCRIPTION OF THE PREFERRED EMBODIMENT

Figure 1:
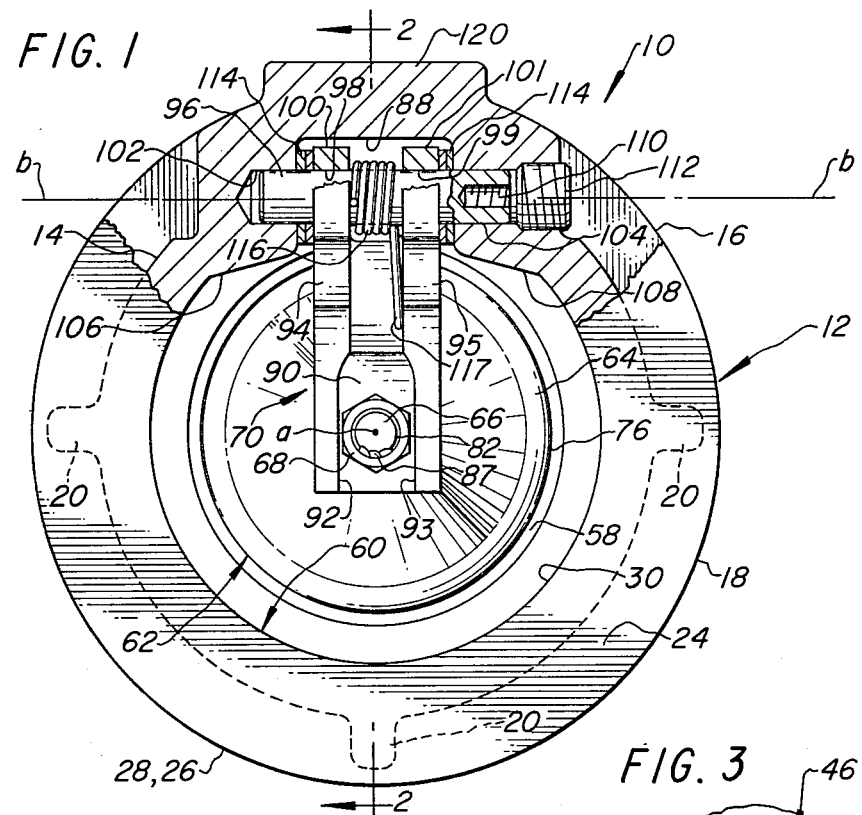
FIG. 1 is a rear view of a check valve in accordance with the present invention, partially broken away in section, looking in an upstream direction along the axis of the valve.
Figure 2:
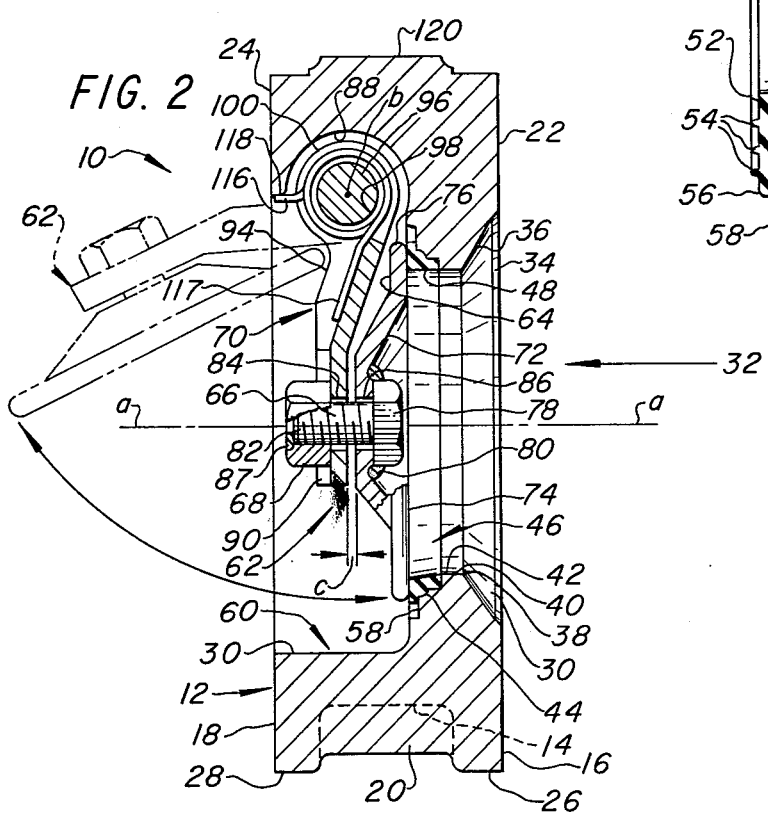
FIG. 2 is a sectional view of the valve of FIG. 1 taken at 2—2 with the valve illustrated in a full open position in phantom.

The novel features believed characteristic of this invention are set forth in the appended claims. The invention itself may be best understood and its various objects and advantages best appreciated, however, by reference to the detailed description below in connection with the accompanying drawings. In FIGS. 1 and 2 of those drawings a check valve constructed according to the present invention is illustrated and generally designated by reference numeral 10. Check valve 10 has a cast and machined body 12 which includes a generally cylindrical sleeve portion 14. The valve is bounded on its upstream and downstream ends by radially extending flanges 16 and 18, respectively, which are reinforced by three circumferentially spaced webs 20. Flange faces 22 and 24, which lie in parallel planes, are substantially flat and contain a plurality of small machined concentric grooves (not shown) to facilitate gasket sealing. The axial length of the check valve is the distance measured between these parallel plains along longitudinal axis "a". The outer circumference of each of the flanges, defined by surfaces 26 and 28, is sized to fit closely within the bold circle of a standardized bolted pipe flange.

Check valve 10 also has an inner surface 30 which defines a fluid pathway extending axially through the valve and generally indicated by numeral 32. The passageway begins on the upstream side of the valve at opening 34 which has a diameter corresponding to the nominal inside diameter of the upstream section of the fluid conduit (not shown). Proceeding in a downstream direction the passageway tapers radially inward through section 36 to a point of minimum diameter at location 38. From that point the diameter increases gradually through section 40 to upstream edge 42 of annular seat recess 44.

Figure 3:
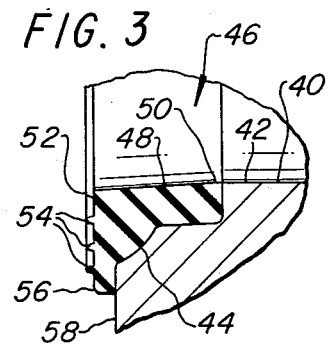
FIG. 3 is an enlarged view of a portion of the valve of FIG. 2 showing details of the seal and seal recess.

Seat 46, also annular in shape, is poured in place in recess 44 during manufacture of the body. Preferably it is made of synthetic rubber, but any one of a variety of commonly known resilient moldable materials with a memory may be substituted. Referring to the more detailed partial cross-section of FIG. 3, it can be seen that the seat has an inner wall 48, which is flush at its upstream edge 50 with edge 42 and tapers radially outward in a downstream direction therefrom. Positioned on the downstream side of the seat is annular seating surface 52 which lies in a plane substantially normal to axis "a". Seating surface 52 includes a plurality of concentric, integrally molded low pressure ribs 54 to improve capability of the seat. Outer edge 56 of the seat overlaps counter bore 58 so that the portion of the seal near seating surface 52 is permitted to expand outward in a radial direction as well as to compress axially when under pressure from the valve.

One advantage of this seat design is that the smooth transition thus provided between the body and the seat minimizes turbulence and pressure losses and also reduces the likelihood of solid matter and debris accumulating immediately upstream of the seat. Another advantage is that the seating surface being oriented in a downstream direction normal to the average flow is well protected from wear and abrasion by solid matter in the flow.

Downstream of seating surface 52 the passageway is expanded into generally cylindrical section 60 to reduce pressure losses when the valve is open. Enlargement of the passageway in this section is intended to compensate for the presence in the passageway of the clapper assembly when it is open.

The clapper assembly, generated indicated by numeral 62, is illustrated in a closed position in FIGS. 1 and 2 with solid lines and in the open position in FIG. 2 with phantom lines. It includes valve 64, bolt 66, adjustment nut 68, and arm 70. All four components are preferably made of stainless steel to resist corrosion and rust. Valve 64 is generally circular in shape and concave in the downstream direction as shown in FIG. 2. Upstream face 72 includes a flat annular seating surface 74 which is adapted to sealably engage seating surface 52 of the seal. The diameter of the valve is somewhat less than the maximum diameter of seating surface 52 permitting some degree of tolerance in the lateral alignment of the seating surfaces when the valve is closed. Outer edge 76 of the valve is preferably rounded to prevent chafing of seating surface 52 and to permit the edge to slide incrementally over the seating surface as the valve moves into position of alignment upon closing.

Valve 64 is loosely secured to arm 70 with bolt 66 and adjustment nut 68. Head 78 of the bolt is mechanically connected to the valve by weld 80 which extends completely around the base of the head and provides a fluid seal between the fastener and the valve. Threaded portion 82 of the bolt extends through hole 86 located in the center of the valve, through oversize hole 84 in the arm, and engages adjustment nut 68 on the downstream side of arm 70. Bolt 66 is threaded into nut 68 until a predetermined clearance "c" is obtained between the arm and the valve as shown in FIG. 2. After the valve is properly adjusted, the nut is locked in position on the bolt by weld 87.

Arm 70, which is precision cast from stainless steel, is pivotally mounted within recess 88 of body 12 to minimize its projection into the passageway when the valve is open. It rotates about axis "b" which is substantially normal to longitudinal body axis "a". The arm includes recess 90 located on its downstream side, which is bounded by walls 92 and 93. Adjustment nut 68, which is partially disposed within the recess is prevented from spinning about the longitudinal axis of bolt 66 by the walls. Surfaces 94 and 95 acts as stops which limit the clockwise or opening rotation of arm 70 so as to prevent valve 64 or adjustment nut 68 from contacting the inner wall of the adjoining conduit (not shown) when the valve is in its full open position.

Arm 70 pivots about pin 96 which is preferably made of stainless steel and passes through holes 98 and 99 in legs 100 and 101, respectively, of the arm. The pin is disposed within bores 102 and 104 located in bosses 106 and 108, respectively, and loosely fitted therein to permit rotation. Tapped hole 110 is provided in one end of the pin to facilitate its removal from the body. The pin is retained in the bores by plug 112, which also provides a fluid seal for bore 104. Thrust washers 114 are placed on either side of arm 70 as needed to center it in passageway 32.

If valve 64 were permitted to swing free from pin 96 it would have the undesirable tendency to slam shut suddenly upon reversal of flow through the valve. Such slamming could damage the valve seat and would produce a potentially damaging pressure valve in the downstream portion of the valve. Ideally, the valve should approach a closed position as the flow rate decreases prior to reversal and close at the moment the flow ceases. In order to reduce the likelihood of the valve slamming shut, it is biased toward a closed position by spring 116 which engages arm 70, encircles pin 96 between legs 100 and 101 and rests against body 12 at point 118. End 117 of the spring, being disposed within recess 90, is protected from contact with any portion of the inner wall as the valve opens.

A significant advantage of this invention is it provides for rapid adjustment during assembly of the free angular movement of the valve relative to the arm. Limited angular freedom of the valve is desirable in order to permit reasonable tolerance in the dimensions and alignment of various components of the valve and yet insure that the seating surfaces of the valve and seat will be properly aligned upon closing. Another advantage of this self-seating feature of the valve is that the slight relative movement between the valve and the seat upon closing tends to scrub the seat and keep it free from accumulations which would interfere with sealing. During assembly, after the bolt has been welded to the valve, it is inserted through oversized opening 84 in the arm to engage nut 68. By rotating the valve, the bolt can be tightened until desired clearance "c" has been obtained. Alternately the valve can be rotated until the desired amount of angular freeplay along any two axes normal to the fastener access has been obtained. Finally, after the valve has been properly adjusted, nut 68 is locked in position on the bolt with tack weld 87.

Certain other features of the valve are designed to facilitate its installation in a fluid conduit. When the valve is to be installed in a generally horizontal conduit it can be quickly aligned by loosely connecting the adjoining conduit flanges with a number of the lower connecting bolts and lowering the valve between the flanges onto the bolts. Then, the valve body should be rotated until boss 126 is projecting upward to place pin 96 in an upper horizontal position a shown in FIG. 1. Finally, gaskets are to be placed in between the flanges, the remaining bolts are inserted, and all bolts are tightened.

Under normal operating conditions, flow passes through the valve in FIG. 2 from right to left and the clapper assembly is pivoted in a clockwise direction to a full open position. Surfaces 94 and 95 of the arm are in contact with the inner wall 30 near point 118. One advantage of this present invention is that when the valve is fully open the passageway through the body is substantially unobstructed by the clapper assembly. Its presence in the passageway is compensated for by the increased cross-sectional area of section 60 so that effective cross-sectional areas upstream and downstream of the seal are substantially the same. In this manner pressure losses through the valve are minimized. Also the present invention incorporates various features to minimize the possibility that debris in the flow might hang on the valve and prevent proper seating. These features include the relatively smooth upstream face of the valve itself and the absence of large projections in the passageway which might tend to accumulate debris. The invention also incorporates various features which simplify repair of the valve. For example, removal of the entire clapper assembly can be accomplished by simply removing plug 112, inserting a threaded tool into tapped recess 110 and withdrawing pin 96 from the body and lifting the clapper assembly out of the body.

Thus, it can be seen that the present invention provides for an improved check valve which incorporates many novel features an offers significant advantages over the prior art. Although only one specific embodiment of this invention has been illustrated and described, it is to be understood that obvious modifications and changes can be made in it without departing from the true scope and spirit of the invention.

What is claimed is:

1. A swing check valve comprising:

a generally cylindrical body having an upstream face and an opposing downstream face arranged for disposition between a pair of opposed flanges in a fluid conduit and defining therebetween the axial length of said body, and means defining a fluid passageway extending axially through said body;

a valve seat disposed within said body, said seat including a first annular seating surface;

an arm pivotally mounted within said body for rotation within said passageway about an axis;

a generally circular valve connected to said arm, said valve having an upstream face including a second annular seating surface adapted to sealably engage said first annular seating surface when said valve is in a closed position;

first and second coaxial cylindrical bores of uniform diameter in said body, said first bore extending partially through said body and being closed at one end and opening at its opposite end into said passageway, and said second bore being axially spaced from said first bore and opening at one end into said passageway and at its opposite end to an exterior wall surface of said body;

a substantially uniform diameter cylindrical pivot pin dimensioned to be a free sliding fit in said first and second bores and insertable entirely within said body through said second bore for supporting said arm for rotation within said passageway;

means for closing said second bore at said exterior wall surface for retaining said pivot pin in said bores; and means on the end of said pivot pin disposed in said second bore for removing said pivot pin from said bores after removal of said means for retaining said pivot pin in said bores.

2. The check valve set forth in claim 1 wherein:

said bores are formed in respective first and second bosses protruding from an inner surface of said body, said bosses being spaced apart one from the other and said arm is pivotally supported by said pivot pin between said bosses.

3. The check valve set forth in claim 2 together with:

thrust bearing means disposed around said pivot pin between said arm and each of said bosses.

4. The check valve set forth in claim 1 wherein:

said means for retaining said pivot pin in said bores comprises a threaded plug threadedly engaged with cooperating threads formed in the other end of said second bore and in substantially fluid sealing engagement with said body.

5. The check valve set forth in claim 1 wherein:

said means for removing said pivot pin from said bores includes a threaded hole formed in said end of said pivot pin disposed in said second bore.

6. The check valve set forth in claim 1 wherein:

said valve includes a threaded fastener fixedly attached to said valve and projecting through a hole in said arm, and an adjusting nut is threadedly engaged with said fastener for loosely retaining said valve connected to said arm.

* * * * *